United States Patent [19]
Voelz
[11] 4,444,287
[45] Apr. 24, 1984

[54] STEERING SYSTEM FOR MOBILE CRANE

[75] Inventor: Richard F. Voelz, Butler, Wis.
[73] Assignee: Renner Manufacturing Company, Milwaukee, Wis.

[21] Appl. No.: 211,410
[22] Filed: Nov. 28, 1980
[51] Int. Cl.$^3$ .............................................. B60K 17/30
[52] U.S. Cl. ..................................... 180/252; 180/308
[58] Field of Search ................ 180/252, 242, 308, 6.3, 180/6.48, 153, 155, 156; 280/95 R, 95 A

[56] References Cited

U.S. PATENT DOCUMENTS

| | | | |
|---|---|---|---|
| 2,909,298 | 10/1959 | Baudhuin | 180/153 |
| 3,448,577 | 6/1969 | Crawford | 180/308 |
| 3,656,570 | 4/1972 | Gortner et al. | 180/242 |
| 3,874,473 | 4/1975 | Grove | 180/156 |
| 3,900,075 | 8/1975 | Chichester et al. | 180/242 |
| 4,114,724 | 9/1978 | Doolittle | 180/155 |

*Primary Examiner*—Joseph F. Peters, Jr.
*Assistant Examiner*—Ross Weaver
*Attorney, Agent, or Firm*—Fred Wiviott

[57] ABSTRACT

A straddle type mobile crane has a pair of hydraulic motor driven front wheels which may be pivoted about a vertical axis for steering. Each motor is supplied by an individual source of pressurized fluid which may be interconnected by a pair of adjustable control valves. A turning crank at each wheel engages a cam coupled to a respective one of the valves so that the hydraulic motors are coupled when the wheels are pivoted through predetermined angles.

5 Claims, 4 Drawing Figures

FIG. 1
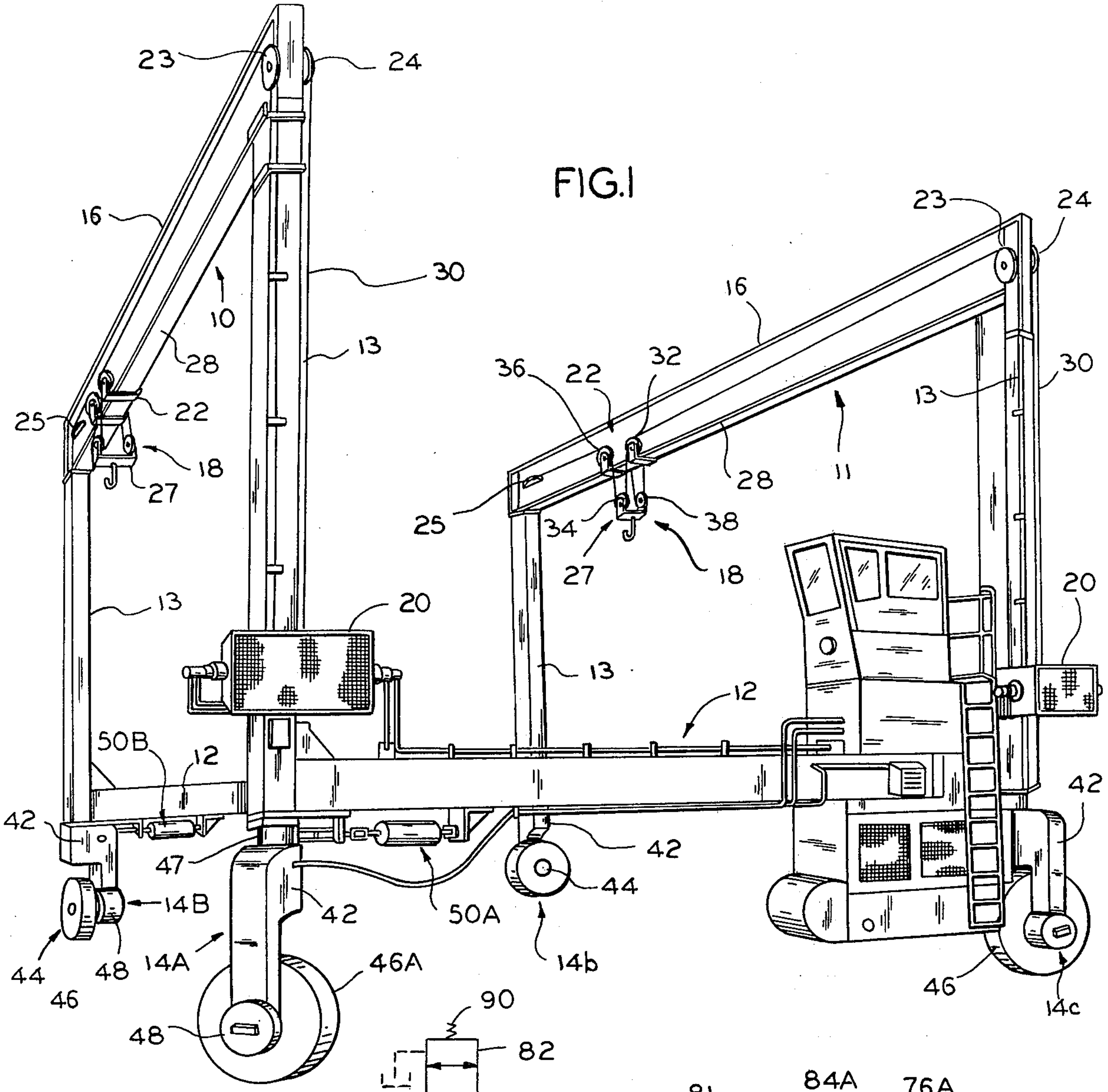
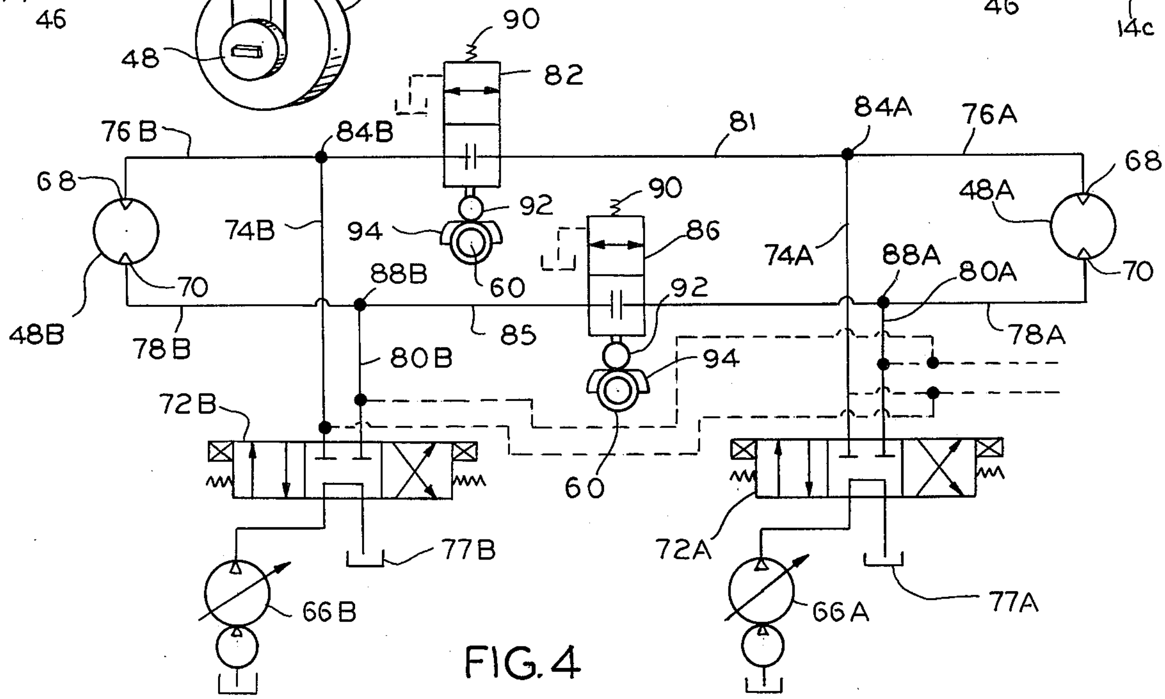
FIG. 4

STEERING SYSTEM FOR MOBILE CRANE

BACKGROUND OF THE INVENTION

This invention relates to straddle type mobile cranes, and more particularly, to a steering system for such cranes.

Straddle type mobile cranes are commonly employed for lifting and moving large bulky objects, such as shipping containers, structural members, modular building sections, heavy machinery and equipment, and the like. Such devices are well known and generally include a pair of inverted U-shaped gantries comprising cross beams spanning vertical columns which are supported at their lower ends on wheels or truck assemblies. The two-gantry assemblies are interconnected by spaced side members and may include hoists supported from the cross beams by means of a trolley so that the load may be elevated and transversed laterally.

On one type of mobile crane, each gantry includes front and rear wheels or trucks with at least the front wheels being driven by individual hydraulic motors. In addition, at least the front wheels are mounted on forks or similar structures so that they can be pivoted about a vertical axis to permit steering. Because of the distance between the wheels, the wheel at the outside of the turn must travel through a longer arc than the inside wheel. In order to permit this speed differential between the inside and outside wheels as the crane moves through a turn, the common practice was to interconnect the hydraulic systems of each wheel motor to provide a differential effect. With the hydraulic systems interconnected, fluid would tend to flow to the wheel which offered the least resistance to fluid flow so that the more rapidly turning outside wheel would receive a greater portion of the fluid flowing to both motors and the inside wheel would conversely receive less. Such differential systems are normally satisfactory for turning but are unsatisfactory should the wheels encounter surfaces having different resistances. For example, should the vehicle engage an ice pack, one of the wheels would begin to spin. Under these circumstances, most of the hydraulic fluid would flow to the spinning wheel so that the device would become stalled. Also, should one of the wheels engage an obstacle, a greater quantity of fluid would flow to the other motor thereby causing the crane to veer toward one side.

SUMMARY OF THE INVENTION

It is an object of the invention to provide a new and improved steering system for mobile cranes.

Another object of the invention is to provide a steering system for a hydraulically driven mobile crane which permits turning without loss of traction should one wheel engage a slippery surface or the tendency to veer should one wheel engage an obstacle.

A further object of the invention is to provide a steering system for hydraulically driven mobile type cranes wherein differential fluid flow occurs only when the device is being turned.

Yet another object of the invention is to provide such mobile cranes with steering systems which permit differential fluid flow during turning and substantially equal flow for straight line traverse.

These and other objects and advantages of the present invention will become more apparent from the detailed description thereof taken with the accompanying drawings.

In general terms, the invention comprises a mobile crane having a pair of spaced apart wheels each driven by a fluid motor, and steering means operative for simultaneously pivoting the wheels about a substantially vertical axis. A fluid supply is coupled for individually driving the fluid motors whereby the wheels are normally rotated at substantially the same speed. A valve means interconnects the fluid motors and is coupled to the steering means whereby the valve means is maintained in a closed position when the steering means orients the wheels in an unpivoted position and directed for movement generally in a longitudinal direction relative to the crane. A coupling means coupled to the steering means is constructed and arranged for moving the valve means to an open position when the steering means is actuated to pivot the wheels out of their unpivoted position thereby interconnecting the first and second fluid motors so that the fluid motor driving the wheel having the largest turning radius may receive additional fluid from the fluid supply means.

BRIEF DESCRIPTION OF THE DRAWINGS

FIG. 1 is a perspective view of a gantry type crane which includes a steering system according to the present invention;

FIG. 4 schematically illustrates the hydraulic circuit of the drive wheels of the gantry type crane shown in FIG. 1.

DETAILED DESCRIPTION OF THE PREFERRED EMBODIMENT

Figure 2:
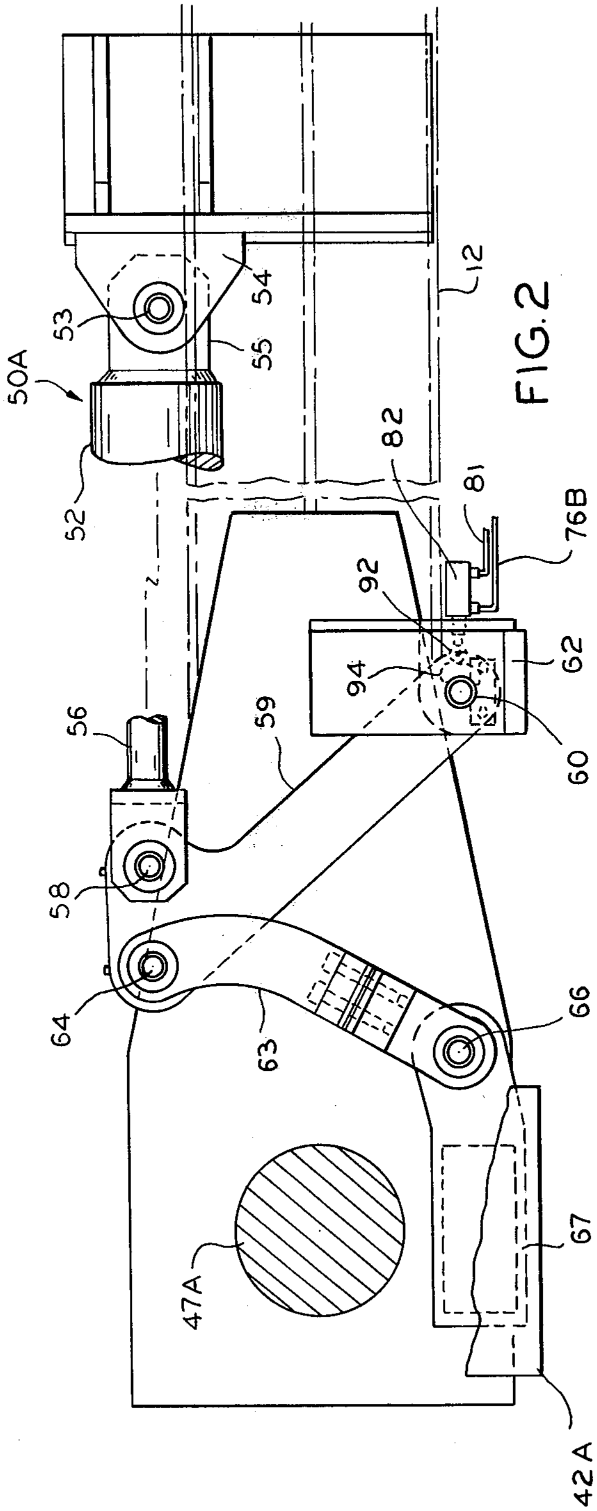
FIG. 2 is a top plan view of one portion of the steering assembly supplied to a front wheel truck of the gantry crane of FIG. 1.

Referring to FIG. 1, the gantry type mobile crane to which the present invention is applicable is shown to include a pair of U-shaped gantries 10 and 11 connected by spaced side girders 12. Each gantry includes a pair of vertical column members 13 supported at their lower ends by truck assemblies 14 and interconnected at their upper ends by horizontal cross members 16. For purposes of discussion, the reference numeral 14 will be used when discussing the trucks 14 collectively while the numerals and letters 14A, 14B, 14C and 14D will be used specifically to identify the trucks located at the right front, left front, right rear and left rear, respectively, of the assembly. Other portions of the assembly discussed below will be similarly identified depending upon whether the portions are discussed generally or specifically.

Each gantry 10 and 11 also includes a lifting assembly 18 which are identical and accordingly, only one will be described for the sake of brevity. Each lifting assembly 18 includes a winch 20, a trolley 22, idler sheaves 23, 24 and 25 and a hook block 27. As those skilled in the art will appreciate, the trolley 22 includes wheels (not shown) which ride on flanges 28 on each of the opposite sides of its associate cross beams 16. A wire rope extends upwardly from each winch 20, over sheaves 23, around a first sheave 32 on trolley 22, downwardly and around a pulley 34 on hook block 27, upwardly and over a second sheave 36 on trolley 22, around sheave 25 at the opposite side of beam 16, backwardly along the opposite side of beam 16, around an additional sheave (not shown) on trolley 22, around a second pulley 38 on hook block 27, upwardly and over another sheave (not shown) on the opposite side of beam 16, around sheave 24 and back to winch 20. Because the operation of trolley 22 and hook block 27 form no part of the invention, they will not be discussed in detail. It will be sufficient for purposes of understanding the invention merely to state that the trolleys 22 may be moved longitudinally on their respective cross beams 16 and the hook blocks 27 may be elevated for purposes of positioning, lifting and replacing a load.

Each truck 14 includes a yoke 42 upon which an axle 44 rotatably supports a wheel 46. The yokes 42 are pivotally mounted for movement about vertical axes by means of a vertically extending king pin 47 suitably received in a bearing (not shown) in the lower end of its associated column 13. Also mounted on each front yoke 42 is a hydraulic drive motor 48 for rotating wheels 46 whereby the assembly may be moved from one location to another. Each front wheel assembly 14A and 14B is provided with a steering assembly 50A and 50B, respectively, which are identical except that one is the mirror image of the other. Accordingly, only steering assembly 50A will be discussed in connection with FIGS. 2 and 3. In particular, steering assembly 50A includes a cylinder 52 pivotally mounted at one end by means of a pin 53 extending vertically through a bracket 54 affixed to the side of girder 12 and a lug 55 affixed to the end of cylinder 52. A piston rod 56 extends from the other end of cylinder 52 and is pivotally connected at its end by means of a pin 58 to one end of a bell crank arm 59, the other end of which is pivotally mounted by means of a pin 60 to a bracket 62 affixed to girder 12 in spaced relation from bracket 54. A clevis arm 63 is pivotally connected by a pin 64 to the end of crank arm 59 adjacent pin 58. The other end of clevis arm 63 is pivotally connected by pin 66 to a steering arm 67 affixed to one side of yoke 42A.

Figure 3:
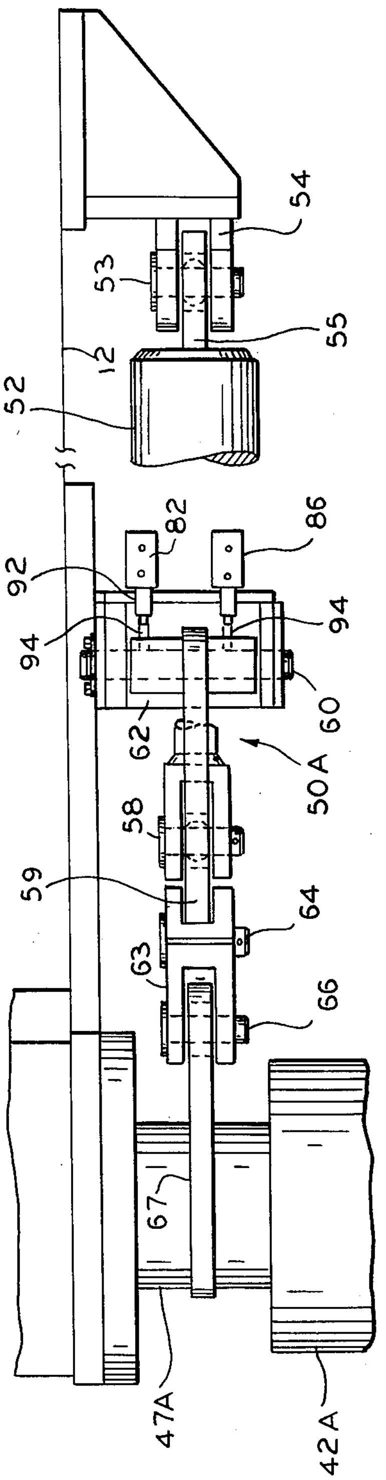
FIG. 3 is a front view of the steering mechanism shown in FIG. 2.

The steering assembly 50A is shown in its neutral position in FIGS. 2 and 3 wherein the wheels 46 are pointed forwardly and the piston rod 56 is in a midpoint position relative to cylinder 52. When it is desired to turn the wheel 46 in a counterclockwise direction as viewed in FIG. 2, the piston rod 56 is forced inwardly of cylinder 52 thereby rocking bell crank arm 59 clockwise which in turn pivots yoke 42A counterclockwise through the agency of clevis arm 63. Movement of the wheel in a clockwise direction is accomplished by moving piston rod 56 outwardly of cylinder 52 thereby rocking bell crank arm 59 counterclockwise thereby rotating yoke 42 clockwise about king pin 47A.

FIG. 4 shows the hydraulic circuit for coupling the drive wheel motors 48A and 48B to hydraulic pumps 66A and 66B, respectively. It will be appreciated that motors 48A and 48B are each conventional reversible rotary hydraulic motors having an inlet 68 and an outlet 70 which defines the forward direction. The pump 66A is coupled to the inlet 68 of motor 48A by a flow reversing valve 72A and conduits 74 and 76. A return path from the outlet 70 of motor 48A to sump 77A is provided by conduits 78A, 80A and valve 72A. Similarly, a fluid path to motor 48B from pump 66B to sump 77B is provided by valve 72B and conduits 74B, 76B, 78B and 80B. The valves 72A and 72B may be solenoid operated and are shown in their neutral positions wherein no fluid is delivered to either of the motors 48A or 48B. If it is desired to drive the wheels in their forward direction, each of the valves will be stepped to the right as viewed in FIG. 3. On the other hand, should it be desired to drive the motors 48A and 48B in the reverse direction, each of the valves 72A and 72B is stepped to the left.

A first conduit 81 and a first valve 82 interconnect the junction 84A between conduits 74A and 76A and the junction 84B between conduits 74B and 76B. A second conduit 85 and a second valve 86 interconnect the junction 88A between conduits 78A and 80A and junction 88B between conduits 78B and 80B. Valves 82 and 86 are each of a type having an orifice or flow passage whose size is governed by the position of a spool which is biased by a spring 90 to a closed position. The spool is movable progressively to an open position when a plunger 92 is depressed. As seen more particularly in FIGS. 2 and 3, plunger 92 is engaged by a cam 94 mounted on one of the bell crank arms 59, although it may also be mounted on any part of the steering systems 50 or yokes 42. The valves 82 and 86 may each be mounted adjacent the same bell crank arm 59 as shown in FIG. 3 for being simultaneously opened or each valve may be mounted adjacent a different bell crank arm.

When the wheels 16 are directed forwardly for straight line movement, either in the forward or reverse directions, the plunger 92 will be in a center position with respect to the cam 94 and accordingly, each of the valves 82 and 86 will be closed. When in this position, pressurized fluid from pump 66A will flow to wheel 48A and pressurized fluid from pump 66B will flow to motor 48B without any crossover. As a result, should one of the wheels move onto a patch of ice, for example, the other wheel can still be driven. Further, should one of the wheels engage an obstacle, both wheels will be driven at the same speed so that the crane will not yaw.

When it is desired to turn the crane in either direction, the crank arms 64 at each side of the assembly will be pivoted simultaneously. However, because of the distance between the wheels 46A and 46B, it is necessary that the wheel on the same side as the direction in which the crane is being turned, be pivoted through a greater angle than the other wheel. This is shown in FIG. 1 where the wheel 46B has been turned through a greater angle than wheel 46A. It will also be appreciated that the wheel on the outside of the turn will have to move through a longer arc than the other wheel and, therefore, must rotate at a faster rate. The actuation of the steering assembly 50A will also rotate the king pin 48 thereby causing cams 94 to depress plungers 92 to open the valves 82 and 86. The angle that crank 64 must move to fully open the valves will depend upon the distance between each of the various wheels. In any event, as the valves begin opening, fluid for both the pump 66A and 66B is free to flow to each of the motors 48A and 48B. As a result, more fluid will flow to the motor on the outside of the turn which must rotate at a faster speed than the motor on the inside of the turn. The crossover flow will continue to the more rapidly rotating motor until the wheels are again returned to alignment.

While only a single embodiment of the invention has been illustrated and described, it is not intended to be limited thereby but only by the scope of the appended claims.

I claim:

1. A mobile crane having a plurality of spaced apart wheels, steering means coupled to first and second ones of said wheels for simultaneously pivoting the same about substantially vertical axes, first and second fluid motor means respectively coupled to said first and second wheels for rotating the same, first and second independent fluid supply means respectively coupled to said first and second fluid motor means for individually driving the same independently of the rate of fluid flow at the other fluid motor means whereby said wheels are normally rotated at substantially the same speed, first and second variable flow valve means interconnecting said first and second motor means, coupling means for coupling said steering means to said first and second valve means and being operative to maintain said valve means in a closed position when said steering means is oriented such that said wheels are in an unpivoted position and directed for movement generally in a longitudinal direction relative to said crane, said coupling means being constructed and arranged for progressively moving said valve means between closed and open positions when said steering means is actuated progressively to pivot said wheels out of their unpivoted position thereby interconnecting the first and second fluid motor means so that the fluid motor means driving the wheel having the largest turning radius may receive additional fluid from the fluid supply means connected to the other fluid motor means, the amount of additional fluid being related to the degree that said steering means is turned.

2. The mobile crane set forth in claim 1 wherein each said fluid motor means is reversible and has an inlet and an outlet, said fluid supply means including first and second pump means and a fluid reservoir, first and second reversible valve means for selectively coupling said first and second pump means respectively to the inlet and outlet of said first and second fluid motor means, said valve means including a first valve disposed between the inlets of said first and second fluid motor means and a second valve disposed between the outlets of said first and second fluid motor means.

3. The mobile crane set forth in claim 2 wherein said first and second valves are normally closed, said steering means being operable to simultaneously open said first and second valves at least partially when said first and second wheels are pivoted through a predetermined angle in either direction from their unpivoted positions.

4. The mobile crane set forth in claims 1, 2 or 3 wherein said coupling means includes cam means coupled to said steering means, said first and second valves including plunger means coupled to said cam means and operable to open said valves when the cam means move said plungers a predetermined distance in a first direction, and means resiliently biasing said plungers in an opposite direction for closing said valves when said steering means returns said valves to their unpivoted position.

5. The mobile crane set forth in claim 4 wherein said steering means includes first and second crank arms coupled to said first and second wheels respectively, said steering means also including means for simultaneously pivoting said crank arms for turning said first and second wheels, at least one of said crank arms having a cam thereon for engaging the plunger of each of said first and second valves.

* * * * *